United States Patent [19]
Ostlinning et al.

[11] 4,334,421
[45] Jun. 15, 1982

[54] DISCHARGE ROLL TABLE WITH A TOP COVER

[75] Inventors: Günter Ostlinning; Alfred Steinmetz, both of Dusseldorf, Fed. Rep. of Germany

[73] Assignee: Schloemann-Siemag Aktiengesellschaft, Dusseldorf, Fed. Rep. of Germany

[21] Appl. No.: 185,553

[22] Filed: Sep. 9, 1980

[30] Foreign Application Priority Data

Sep. 29, 1979 [DE] Fed. Rep. of Germany ....... 2939606

[51] Int. Cl.³ .................... B21C 35/00; B21B 39/14; B21D 45/00; B65G 47/10
[52] U.S. Cl. ........................................ 72/257; 72/252; 72/251; 72/426; 198/369; 198/372
[58] Field of Search ............... 198/369, 370, 372, 366; 72/257, 250, 251, 426, 428, 222, 228, 231, 252; 83/155.1, 158

[56] References Cited

U.S. PATENT DOCUMENTS

| 921,165 | 5/1909 | Ross | 198/372 |
|---|---|---|---|
| 1,760,875 | 6/1930 | Little | 198/372 |
| 2,799,382 | 7/1957 | Dillingham | 198/372 |
| 3,181,334 | 5/1965 | Mattson et al. | 72/257 |
| 3,799,015 | 3/1974 | Bush, Jr. et al. | 83/155.1 |
| 3,930,395 | 1/1976 | Bretscheider et al. | 72/251 |

FOREIGN PATENT DOCUMENTS 440170 2/1975 U.S.S.R. .............................. 72/250

Primary Examiner—Lowell A. Larson
Attorney, Agent, or Firm—Holman & Stern

[57] ABSTRACT

The discharge roll table comprises a plurality of rollers for receiving extruded bar or tube. A top cover extending along the table above the rollers is of substantially inverted V-shape cross section and is divided along the top edge into two half covers pivotable to the left and right of the table respectively. Each half cover is divided into cover sections aligned end to end and is connected at an angle to lifting devices arranged between the rollers. Thus the extruded product may be lifted to the left or right of the table, which may be substantially the same length as the extruded product.

3 Claims, 3 Drawing Figures

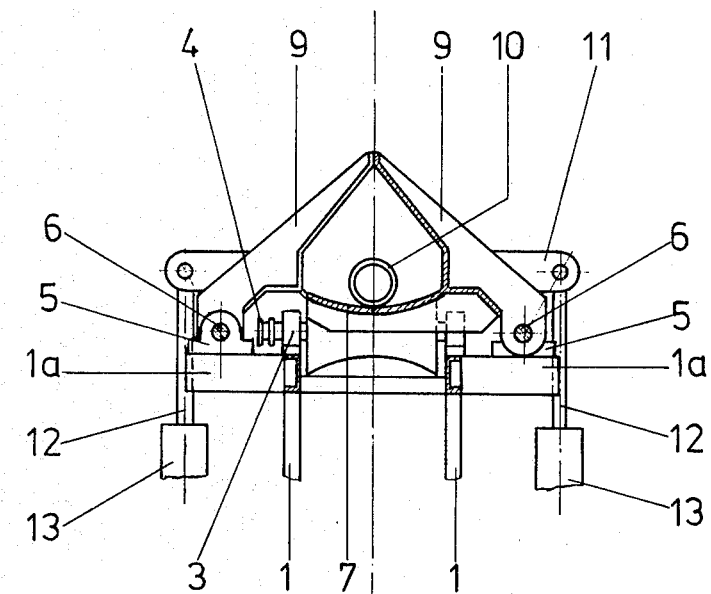
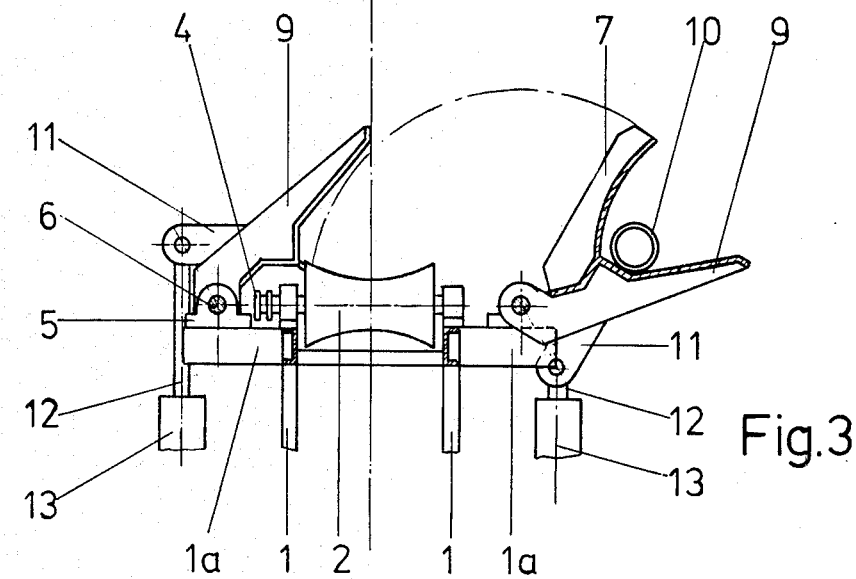

DISCHARGE ROLL TABLE WITH A TOP COVER

BACKGROUND OF THE INVENTION

Field of the Invention

This invention relates to a discharge roll table for guiding a bar or tube discharged from an extrusion press and having a top cover extending along the table over the rollers, and lifting means arranged between the rollers of the roll table for lateral transport of the extruded product from the roll table.

Description of the Prior Art

It is known to provide a discharge roll table with a cover. This is used extensively also for safely guiding bar sections and tubes which have not just been discharged from the press, and without endangering personnel working nearby.

During extrusion of steel tubes, the punch of the press, which is internally cooled, can be torn away. This torn-off part is thrown with great speed in the direction of the roll table, and can cause great damage there and endanger personnel.

One of the known covers for a discharge roll table consists of a single piece. In order to remove the extruded products, the cover must be removed or pivoted to one side so that the extruded product can be removed on a conveyor from one side only of the roll table. It is not possible to remove the extruded product from the other side of the table. If the cover is fixed, the roll table must be extended by an amount equal to the length of the extruded product, so that the product can be removed freely.

SUMMARY OF THE INVENTION

An object of the present invention is to provide a discharge roll table with a top cover, which allows the extruded product to be removed from either side of the table and which need not be substantially longer than the length of the extruded product.

The invention provides a discharge roll table for guiding a bar or tube discharged from an extrusion press, comprising a plurality of rollers for receiving the discharged bar or tube, a top cover extending along the table above the rollers, wherein the cover is of substantially inverted V-shape cross section and is divided along the top edge into two half covers pivotable to the left and right of the table respectively, each half cover being divided into cover sections aligned end to end and being connected at an angle to lifting devices arranged between the rollers, whereby the bar or tube may be lifted upwardly to the left or right of the table.

Thus the cover is coordinated with the lifting devices in such way that both may be lifted to either side, thus lifting and discharging the extruded product to either side of the table. Furthermore, it is now possible to build the discharge table substantially the same length as the extruded product.

Preferably, the cover sections arranged on the right and left of the roll table are staggered by half their length. Thus it is possible that at full or half coverage, there is a lifting device arranged at each respective cover section.

As an example, the lifting devices, counting from the beginning of the discharge roll table, are so arranged that the odd numbers 1, 3, 5, 7 etc are liftable to the right-hand side and the even numbers 2, 4, 6, 8 etc are liftable to the left-hand side between the rollers.

Preferably, the lifting devices are freely pivotable with the respective cover sections of one half cover upwardly and outwardly from under the opposite half cover when in the closed position.

In this way it is possible by means of a single rotating shaft arranged along the roll table to pivot simultaneously the lifting devices and the one half cover consisting of the cover sections without the other half cover being moved in any way.

BRIEF DESCRIPTION OF THE DRAWINGS

An embodiment of the invention will now be described with reference to the accompanying drawings, wherein:

FIG. 2 is a section taken along the lines II—II of FIG. 1 with the roll table cover closed and FIG. 3 is a view similar to FIG. 2 with the cover open on one side.

DESCRIPTION OF THE PREFERRED EMBODIMENTS

Figure 1:
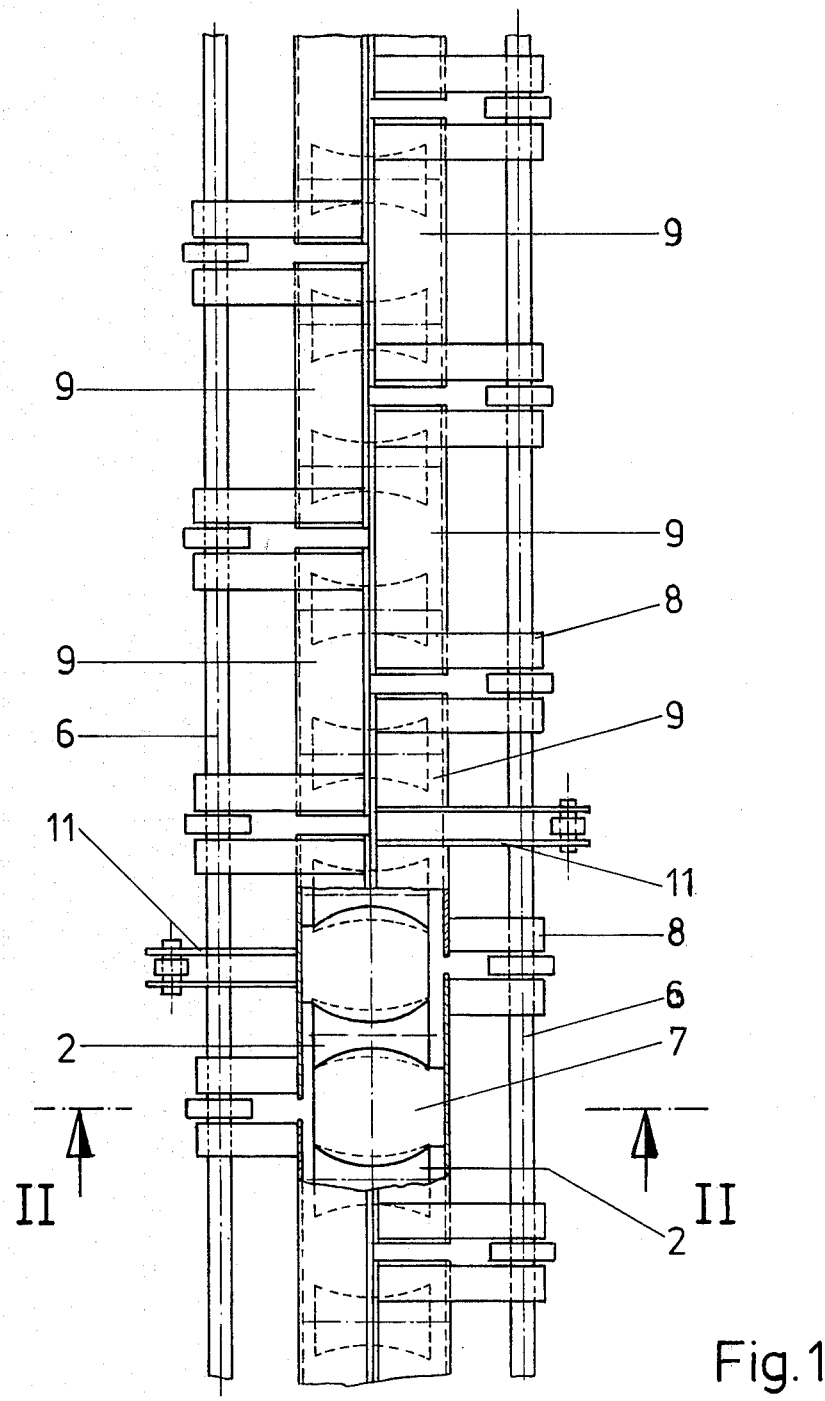
FIG. 1 is a plan view of a discharge roll table with a top cover in accordance with the invention.

Concave rollers 2 are mounted in bearing 3 (FIG. 2) on a frame 1 of a discharge roll table, and may be rotatably driven together by means of a drive chain 3. Horizontal frame members 1a are arranged to the right and left of the basic frame 1 and are provided with bearings 5. Drive shafts 6 are arranged in the bearing shaft 5 on the right and left of, and parallel to, the roll table.

Lifting devices 7 are connected to the drive shafts 6 by a clamping joint 8. The lifting devices 7 lie between the individual rollers 2, and are so arranged that they each slightly cover the radial edges of two adjacent rollers, and are formed as curved plates having a radius of curvature corresponding to the radius of concavity of the rollers 2.

Cover sections 9 are fixedly connected to the lifting devices 7 at an acute angle, for example, about 60 degrees, or can be formed as a one-piece construction therewith. Thus the cover sections 9 each reach to the central axis of the roll table, and abutt along this axis the cover sections 9 of the other side of the roll table. The cover sections 9 together form a pointed roof of inverted V-shaped section which is divided at the top along the longitudinal axis.

The cover sections 9 connected to each lifting device 7 pivot upwardly to the right and left of the roll table. For example, the lifting devices 7 with their cover sections 9 may be arranged successively from the rear of the press, i.e. from the beginning of the roll table, with odd numbers 1, 3, 5, 7, etc. arranged on the right, and with even numbers 2, 4, 6, 8, etc arranged on the left, each being pivotable upwards between the individual rollers 2 of the roll table. Thus the cover sections 9 are staggered halfway along their length to the right and left of the middle of the roll table.

The angle between the lifting device 7 and cover section 9 is such that if, for example, the cover sections 9 on the left side of the roll table are in position, i.e. closed, the lifting devices 7 of the right-hand cover sections 9 are pivoted upwardly to the right from underneath the left-hand cover sections 9 so as to lift the bar or tube 10 on the roll table 2 to the right.

Lifting levers 11 are provided along the roll table, and are connected at one end to respective cover sections 9, or can be made integral therewith. To provide a common drive, piston rods 12 are pivotably connected to the other ends of the levers 11 and extend downwardly to hydraulic cylinders 13. The hydraulic cylinders 13 are also pivotably mounted (not shown).

I claim:

1. A discharge roll table for guiding a bar or tube discharged from an extrusion press, the table comprising a plurality of rollers for receiving the discharged bar or tube; a top cover extending along the table above the rollers, the cover being of substantially inverted V-shape cross section with a longitudinal top edge along which said cover is divided into two half covers pivotable on said table to the left and right thereof, respectively, each half cover being divided into cover sections aligned end to end; and lifting means arranged between the rollers, said half covers being fixedly connected at an angle to said lifting means for pivotable movement therewith, whereby extruded product may be lifted upwardly and to the left or right of said table.

2. A discharge roll table according to claim 1, wherein the cover sections arranged on the right and left of the roll table are staggered with respect to each other by half their length.

3. A discharge roll table according to claim 1, wherein the lifting devices are freely pivotable with the respective cover sections of one half cover upwardly and outwardly from under the opposite half cover when in the closed position.

* * * * *